United States Patent Office 3,295,186
Patented Jan. 3, 1967

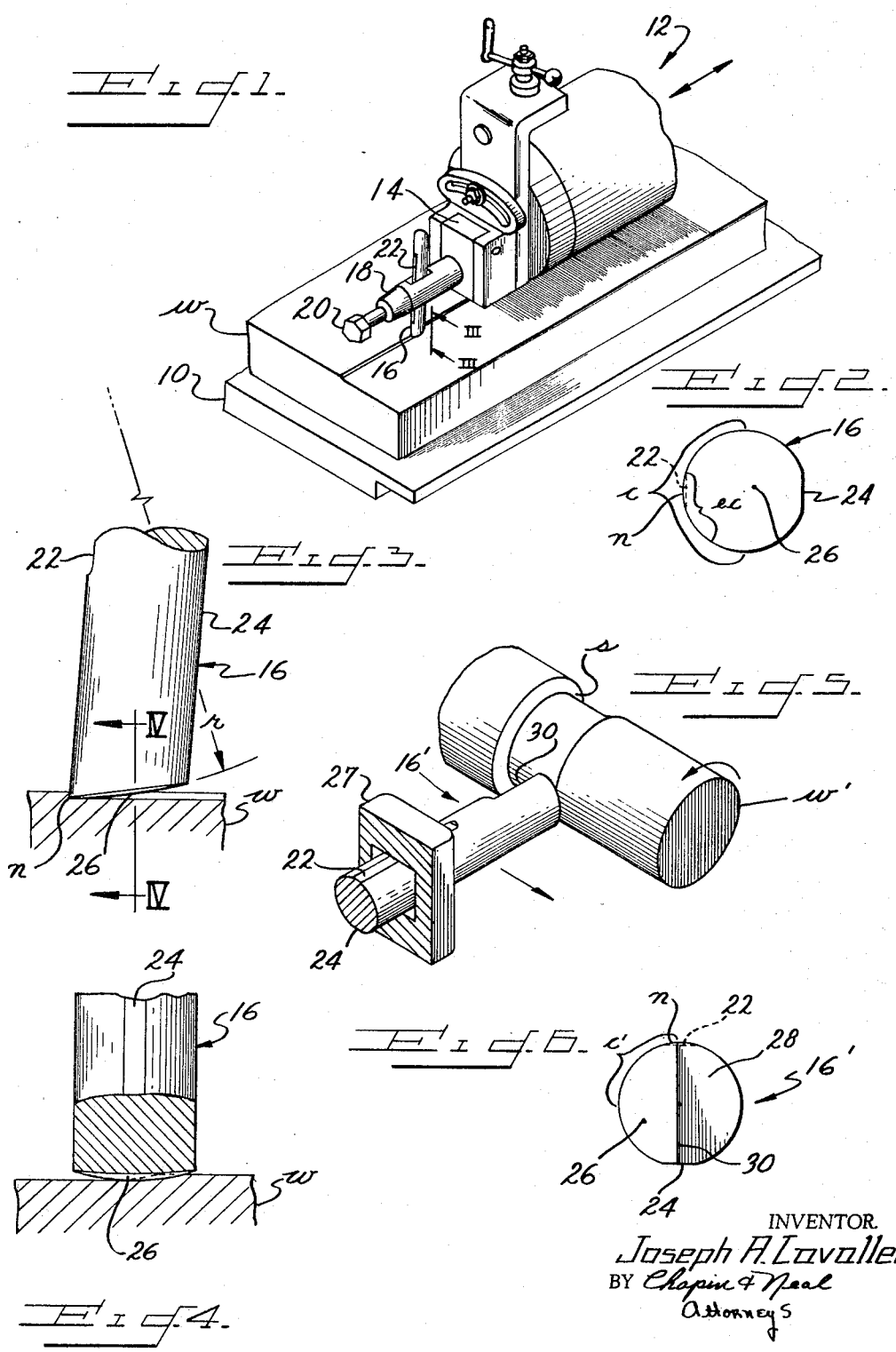

3,295,186
CUTTING TOOLS
Joseph Aime Lavallee, Springfield, Mass., assignor to Lavallee & Ide, Inc., Chicopee, Mass., a corporation of New York
Filed Aug. 19, 1964, Ser. No. 390,615
5 Claims. (Cl. 29—95)

The present invention relates to improvements in metal cutting tools.

Over the years notable progress has been made in increasing the performance characteristics of cutting tools employed on lathes, shapers, etc., primarily if not exclusively through metallurgical improvements, particularly in the field of sintered carbides. However, improved strength and toughness of cutting tools do not necessarily increase machinability, particularly as it is a factor of the geometry of the cutting edge.

An example of this, and a motivating factor for the present invention is found in machining titanium, a vital need in present space program developments. High speed steel cutting tools do not stand up in machining this metal for anything even approaching accepted production rates. Sintered carbide cutting tools do not break down in machining titanium but become fouled by an apparent affinity of titanium for carbide so that acceptable production of machined titanium parts is difficult, at best, to obtain.

The object of the invention is to improve the cutting geometry of tools of the type referred to, thereby increasing the ease of machinability of most, if not all, metals and further to enable the use of less expensive materials for such cutting tools.

These ends are attained by a cutting tool broadly characterized in having a nose for first engaging a workpiece and a cutting edge extending laterally of the nose, inwardly from the point of first contact and also inwardly of the length of the tool, and further wherein the end face of the tool is compound convexly curved and relieved from the cutting edge. Preferably this geometry is obtained by forming a convex spherical end face on an elongated cylinder with the end face being generated by a radius swung from a point spaced from and adjacent the cylinder. This enables the tool to be disposed at a positive rake angle relative to the workpiece with the compound convex end face relieved from the cutting edge as the workpiece is being machined. Where sharp shoulders are to be machined a notch is provided in the end of the tool removing material laterally from one side of the nose.

The above and other related objects and features of the invention will be apparent from a reading of the following description of the accompanying drawing and the novelty thereof pointed out in the accompanying claims.

In the drawing:

FIG. 1 is a fragmentary perspective view of a machine in which the present tool would be used;

FIG. 2 is an end view of the tool seen in FIG. 3;

FIG. 3 is a section, on an enlarged scale, taken on line III—III in FIG. 1;

FIG. 4 is a section taken on line IV—IV in FIG. 3;

FIG. 5 is a perspective view illustrating a modified embodiment of the invention; and FIG. 6 is an end view of the tool seen in FIG. 5.

FIG. 1 shows, in fragmentary fashion, a metal cutting shaper to illustrate one type of machine in which cutting tools of the present invention would be employed. The shaper comprises a bed 10 to which a workpiece w is firmly secured by conventional means (not shown). A tool head 12 is reciprocated in the direction indicated to make successive passes over the workpiece w. A clapper 14 is vertically and angularly adjustable on the reciprocating head 12 to position a cutting tool 16 relative to the workpiece w. Before each forward stroke of the head 12, the bed 10 is incrementally advanced in a transverse direction to bring a further portion of the workpiece w in the path of the cutting tool 16 for removal of stock therefrom.

The clapper 14 comprises a post 18 which is slotted to receive the cutting tool 16 and a screw 20 clamps the tool in this slot. Advantageously the tool 16 is formed from a length of round stock (i.e. a cylinder having a circular cross section) and provided with flats 22, 24 on its opposite sides. The screw 20 engages flat 22 and forces flat 24 against one side of the slot in post 18. This orients the cutting edge of tool 16 relative to the workpiece and prevents rotation thereof when in use.

The portion of the tool which first engages the workpiece is referred to as its nose $n$ (FIGS. 2 and 3). The cutting edge of the tool is characterized by progressively extending as a convex curve laterally from the nose $n$ as well as inwardly from the point of first engagement with the workpiece and inwardly of the length of the tool. The tool seen in FIG. 2 has a theoretical cutting edge $c$ having an angular extent of 180° with the nose $n$ being centrally disposed. In most operations a lesser angular extent is actually effective in removal of material. Bracket $ec$ indicates the approximate effective cutting edge of tool 16 as it is removing material from the workpiece $w$ in FIG. 1.

Advantageously the nose $n$ is aligned with one of the clamping flats (22 or 24) to facilitate the illustrated orientation of the cutting tool relative to the workpiece as it is being machined. It will also be noted that the flat 22 terminates short of the nose $n$ so as to have no effect on the cutting geometry of the edge $c$, whereas the flat 24 may conveniently extend the full length of the tool 16.

Preferably, the present tool is formed by grinding (or otherwise forming) on a length of round stock a compound convex end face 26 which is a segment of a sphere. The compound curvature of the end face 26 will be seen from FIGS. 3 and 4. The center of the radius generating the surface 26 is aligned with the nose $n$ and is spaced from but adjacent the cylinder from which the tool is formed so that there will be relief behind all portions of the cutting edge $c$ and also preferably providing for a positive rake of the tool, all of which will be evident from FIGS. 3 and 4. The length of the radius generating end face 26 is preferably 2.5 to 10 times the diameter of the cylinder forming the tool.

The geometry of the cutting edge thus described has been found highly effective in machining operations. The convexly curved cutting edge $c$ which falls away from the nose $n$ and is angled upwardly from the path of movement of the tool removes material by a shearing action having components both parallel and normal to the path of travel of the tool. This type of shearing action in combination with the reenforcement of the edge $c$ by the compound convex curvature of the end face 26, produces truly unexpected improvements in the ease of machining most, if not all, metals.

Thus cutting tools with described geometry have been found effective in overcoming the problems of machining titanium referred to above. In fact, highly satisfactory results have been obtained in machining that metal using cutting tools formed of high speed steel having this improved geometry. The problem of machining this tough material has not only been solved, but the expense of carbide tools and their higher sharpening costs has been avoided.

The present invention in its broader aspects is not limited to the machining of a specific metal, nor to the use of any one material or group of materials for the cutting tool itself.

Cutting tools herein described may be used on many different machine tools where material is removed from workpieces by an equivalent shearing action. The use of such tools in a planer should be obvious. Likewise, certain types of milling cutters may employ such tools, usually as inserts, particularly in a face milling cutter.

FIGS. 5 and 6 illustrate a cutting tool 16' which has been modified for use in an engine lathe. The tool 16' is appropriately mounted in a tool holder 27 on the lathe carriage (not shown) which is fed longitudinally in the usual manner as the workpiece w' rotates thereagainst in the direction indicated.

The cutting tool 16' is the same as the tool 16 except for the provision of a notch 28 in the end thereof. This notch removes all material to one side of the nose n, so that a shoulder s may be formed on the workpiece w. In use the tool 16' is positioned with the inner face 30 of notch 28 aligned with shoulder s and then plunged into the workpiece to the depth of the cut to be taken. The tool is then advanced longitudinally in the indicated direction to turn the workpiece to a lesser diameter.

The inner face 30 of the notch may be angled slightly to provide whatever relief is required from the radial face of the shoulder s. Considering FIG. 5 as showing a left hand shoulder, right hand shoulders would be formed on workpieces by similar cutting tools with a corresponding notch on the opposed side of the end face thereof.

The modified tool 16' forms a sharp corner on the base of the shoulder s and is intended to remove material in only one direction of lateral feed, thus the maximum theoretical cutting edge of this tool has an angular extent of only 90° as indicated by the bracket c' in FIG. 6, and the working cutting edge would usually be somewhat less. The cutting tool 16' could also be used on a shaper or the like where it is desired to form a shoulder or a workpiece being machined by a reciprocating cutter.

The cutting tool 16 could also be employed on a lathe for a turning operation where a sharp shoulder is not desired. This tool can be fed in either direction since its cutting edge is equally effective on opposite sides of the nose n.

Having thus described the invention, what is claimed as novel and desired to be secured by Letters Patent of the United States is:

1. An elongated metal cutting tool comprising a body with a cylindrical end portion having a nose for first engaging a workpiece, a continuously convexly curved cutting edge extending laterally from each side of said nose and inwardly from the point of first contact and also inwardly of the length of said tool, said cylindrical end portion having a spherically formed end face of convex curvature and relieved from said cutting edge.

2. A cutting tool as in claim 1, the body being an elongated cylinder and said convex spherical end face being generated by a radius swung from a center disposed adjacent to and spaced outwardly of the cylindrical surface of the tool and being relieved from said cutting edge as the tool is positioned relative to a workpiece with positive "rake."

3. A cutting tool as in claim 2 wherein the end of said cutting tool is notched laterally of one side of said nose to enable forming of shoulders on workpieces.

4. A cutting tool as in claim 2 wherein flats are formed on opposite sides of said cylinder, one of said flats being aligned with and spaced from said nose and the other flat extending the length of said cylinder.

5. A cutting tool as in claim 2 wherein the radius generating said end face is 2.5 to 10 times the diameter of said cylinder.

References Cited by the Examiner

UNITED STATES PATENTS

| | | | |
|---|---|---|---|
| 1,246,652 | 11/1917 | Petit | 29—95 |
| 2,586,955 | 2/1952 | Kaiser | 29—105 |
| 2,831,240 | 4/1958 | Maurer | 29—95 |

FOREIGN PATENTS 149,016  4/1961  Russia.

WILLIAM W. DYER, Jr., *Primary Examiner.*
HARRISON L. HINSON, *Examiner.*